United States Patent [19]
Havens

[11] Patent Number: 6,124,009
[45] Date of Patent: *Sep. 26, 2000

[54] ASSEMBLY AND ATTACHMENT OF CUSHIONS

[75] Inventor: LaMar D. Havens, Seattle, Wash.

[73] Assignee: Mantec Services Company, Seattle, Wash.

[ * ] Notice: This patent is subject to a terminal disclaimer.

[21] Appl. No.: 09/018,099

[22] Filed: Feb. 3, 1998

Related U.S. Application Data

[63] Continuation-in-part of application No. 08/755,783, Nov. 22, 1996, Pat. No. 5,817,392.

[51] Int. Cl.⁷ .............................. B32B 3/14; B32B 3/26; B32B 3/06
[52] U.S. Cl. .............................. 428/57; 428/71; 428/99; 428/172; 428/182; 297/228.13; 297/DIG. 1
[58] Field of Search .................. 428/57, 99, 71, 428/172, 182, 167; 297/228.13, DIG. 1

[56] References Cited

U.S. PATENT DOCUMENTS

| | | |
|---|---|---|
| 2,921,403 | 1/1960 | Cunnington . |
| 3,499,065 | 3/1970 | Hoskinson et al. . |
| 3,736,022 | 5/1973 | Radke . |
| 4,037,591 | 7/1977 | Sarno . |
| 4,378,396 | 3/1983 | Urai et al. . |
| 4,568,588 | 2/1986 | Fujiki et al. . |
| 5,074,507 | 12/1991 | Axelson et al. . |
| 5,116,557 | 5/1992 | Debaes et al. . |
| 5,409,323 | 4/1995 | Greene . |
| 5,429,417 | 7/1995 | Kim . |
| 5,513,899 | 5/1996 | Michaels et al. . |
| 5,817,392 | 10/1998 | Havens ...................................... 428/99 |

*Primary Examiner*—Alexander S. Thomas
*Attorney, Agent, or Firm*—Christensen O'Connor Johnson Kindness PLLC

[57] ABSTRACT

An assembly and attachment of cushions wherein premolded skins of elastomeric materials are bonded together. In a first embodiment, a thin layer of elastomer is added at the points of connection of the elastomeric skins. In a second embodiment, the cushion formed by the attachment of two elastomeric skins is mounted to a receiving surface by a layer of elastomer formed between one elastomeric skin and a receiving indentation integrally formed in the skin. A third embodiment reinforces the mounting arrangement of the second embodiment by positioning an O-ring around the indentation. A fourth embodiment uses a layer of elastomer formed between one elastomeric skin and the receiving indentation and the O-ring reinforces the mounting arrangement. A method for bonding together premolded skins of elastomeric material is also disclosed.

9 Claims, 7 Drawing Sheets

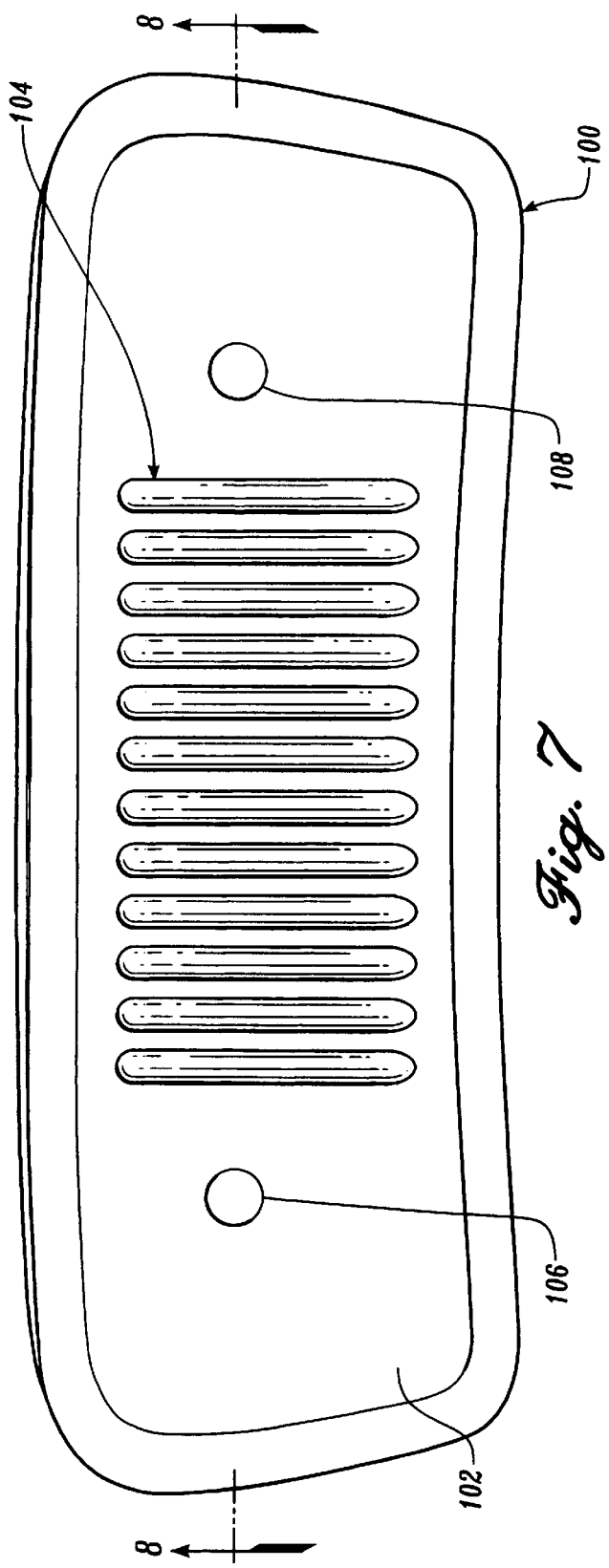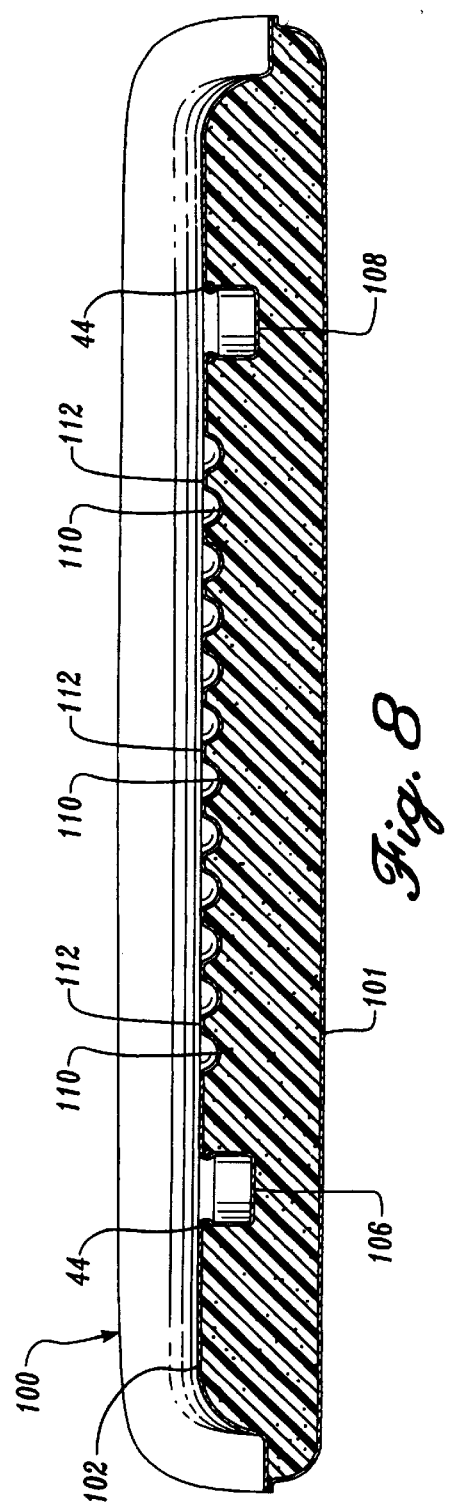

ASSEMBLY AND ATTACHMENT OF CUSHIONS

This application is a continuation-in-part of U.S. patent application Ser. No. 08/755,783, filed Nov. 22, 1996 now U.S. Pat. No. 5,817,392.

FIELD OF THE INVENTION

The present invention relates generally to cushions and, in particular, to molded cushions having skins bonded together to form a watertight seal.

BACKGROUND OF THE INVENTION

In recent years there has been new regulation of materials and processes which emit ozone and oxygen depleting substances. Previously a liquid resistant outer coating or integral skin could be made on flexible urethane foam cushions through the use of a low boiling point liquid such as CFC-11 (freon). Many such materials have been determined by the U.S. Environmental Protection Agency as being damaging to the atmosphere. The integral skin produced with these materials provided a protection to the foam core of the cushion so that the cushions could be utilized in harsh environments. At the same time as a skin was produced in the molding process it was possible to introduce mechanical devices and integrally molded shapes which facilitated the mounting of the cushion on various structures. What is desired therefore, is to adapt a process to use materials which are not deemed to be hazardous to the environment and which can perform the functions of protecting the cushion from water, chemicals, dirt, etc., while at the same time providing a non-invasive means of attaching the cushions to a supporting structure.

In order to attach skins of elastomeric material together, the prior art has used the foam fill material inside the two sheets as a seal and has molded two skins together before the elastomeric material has cured. This has proven to be unsatisfactory because without the elastomeric skins being pre-molded or pre-shaped and with the elastomeric material uncured there is a movement of the fill material behind the skins which is unacceptable.

U.S. Pat. No. 3,499,065 to Haskinson et al. discloses a method of making laminated articles whereby a bond is secured between thermoplastic sheets using a powdered resin.

U.S. Pat. No. 3,736,022 to Radke discloses a molded seat cushion with a cast skin and an insert receiving recess.

U.S. Pat. No. 4,037,591 to Sarno teaches a bath tub therapeutic pad that uses a multiplicity of resilient pad elements encased in a water-proof covering.

U.S. Pat. No. 4,378,396 to Urai, et al. discloses production of a seat cushion with a surface covering.

U.S. Pat. No. 5,116,557 to Debaes et al. discloses a method of making objects having an elastomeric outer wall and a synthetic foam core wherein elastomer is sprayed onto the surface of a mold cavity and before the elastomeric material cures synthetic foam is injected such that the synthetic foam serves to seal two elastomeric layers.

U.S. Pat. No. 5,409,323 to Greene discloses a fastener system for attaching cushions to chairs.

U.S. Pat. No. 5,429,417 to Kim discloses a knockdown chair for children that assembles and disassembles.

U.S. Pat. No. 5,513,899 to Michaels et al. discloses a seat cushion with upper and lower elastomeric elements that are sealed at the edges.

SUMMARY OF THE INVENTION

In order to overcome problems inherent in the prior art, there has been devised by the present invention, a means of using premolded skins of elastomeric materials bonded at the seams to effect a watertight seal between two skins to form the outer cover for a cushion. In addition, portions of the elastomeric skins are reinforced to support a structural attachment means which does not penetrate the skin which would cause a loss of integrity to the skin. This is accomplished in a first embodiment by adding a thin layer of two part urethane elastomer at the point of connection of the elastomeric skins, so that there is an elastomeric and watertight seal between the cover and the polymeric or cushion material.

There is also provided by the present invention, a mounting means for the cushion or the like that is formed in a second embodiment with a layer of two part urethane elastomer formed between the outer elastomeric skin and a receiving indentation in the back surface of the cushion, whereby the two part urethane elastomer reinforces and adds integrity to the receiving indentation. The receiving indentation is formed in the back of the cushion and is adapted to fit standard button arrangements or the like on the outer surface of a receiving surface. In a third embodiment, an O-ring is placed around the receiving indentation to reinforce the receiving indentation and to provide a semi-rigid mounting means to hold the cushion in place and to provide easy attachment of a cushion to a hot tub or the like. Tile cushion is shown attached to a hot tub for illustrative purposes, but it is to be understood that the attachment can be to any receiving surface. In a fourth embodiment, the two part urethane elastomer is formed between the outer elastomeric skin and the receiving indentation in the back of the cushion and the O-ring is also used to reinforce the receiving indentation and to provide a semi-rigid mounting means to hold the cushion in place. In a fifth embodiment, a flexure assembly is formed in the same elastomeric skin as the indentation to allow the cushion to flex a predetermined amount without buckling the skins.

There is, therefore, provided by the present assembly and attachment for a cushion, a watertight sealing, bonding and reinforcing means.

It is, therefore, an object and advantage of the present invention to provide a non polluting in manufacture, watertight seal between layers of elastomeric material.

It is another object and advantage of the present invention to provide a non-polluting in manufacture, watertight mounting means for mounting a cushion or the like to a hot tub or spa.

It is yet another object and advantage of the present invention to provide a watertight mounting means that is reinforced and forms a semi-rigid mounting means for mounting a cushion or the like to a hot tub or spa.

It is still yet another object and advantage of the present invention to provide an elastomeric assembly and attachment that is relatively simple and inexpensive in its manufacture.

It is still yet another object and advantage of the present invention to provide an elastomeric assembly and attachment that maintains stable fill material behind the elastomeric skin.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 7 is a back view of an alternate embodiment of a cushion assembly of the present invention showing the flexure assembly formed between first and second mounting indentations; and FIG. 8 is a cross-sectional view of the cushion assembly of the present invention taken substantially along Section 8—8 of FIG. 7.

DETAILED DESCRIPTION OF THE PREFERRED EMBODIMENT

In general, the present assembly and attachment of cushions provides a means of using premolded skins of elastomeric materials and bonding them at the seams to effect a watertight seal. In addition, in the various embodiments, means are provided for reinforcing portions of the elastomeric skins to support a structural attachment of the cushion formed by the elastomeric skins such that the skins are not penetrated to thereby cause a loss of integrity.

Figure 1:
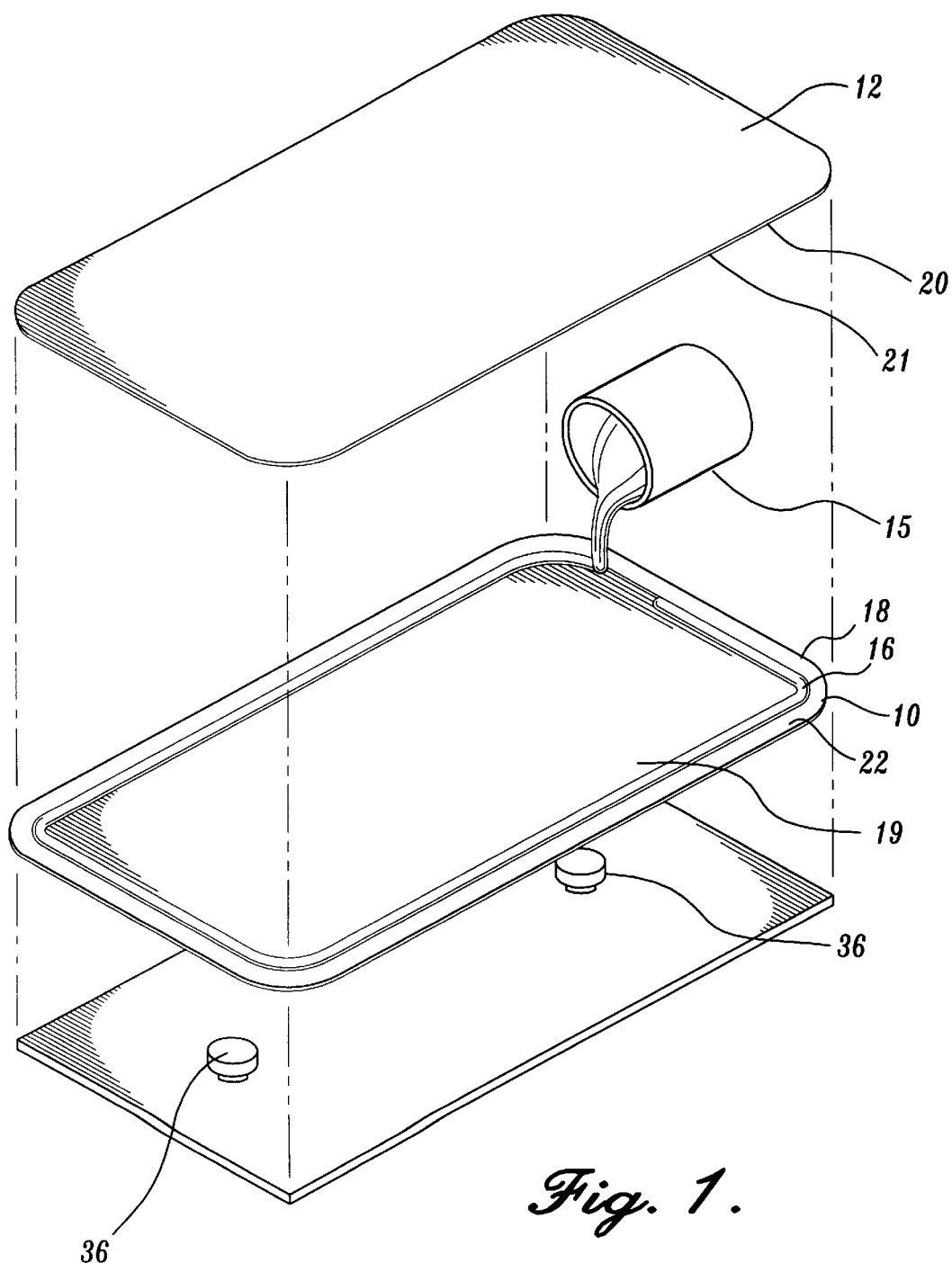
FIG. 1 is an exploded isometric view of the present invention in a first embodiment as it is used to seam or seal two elastomeric skins together.
Figure 2:
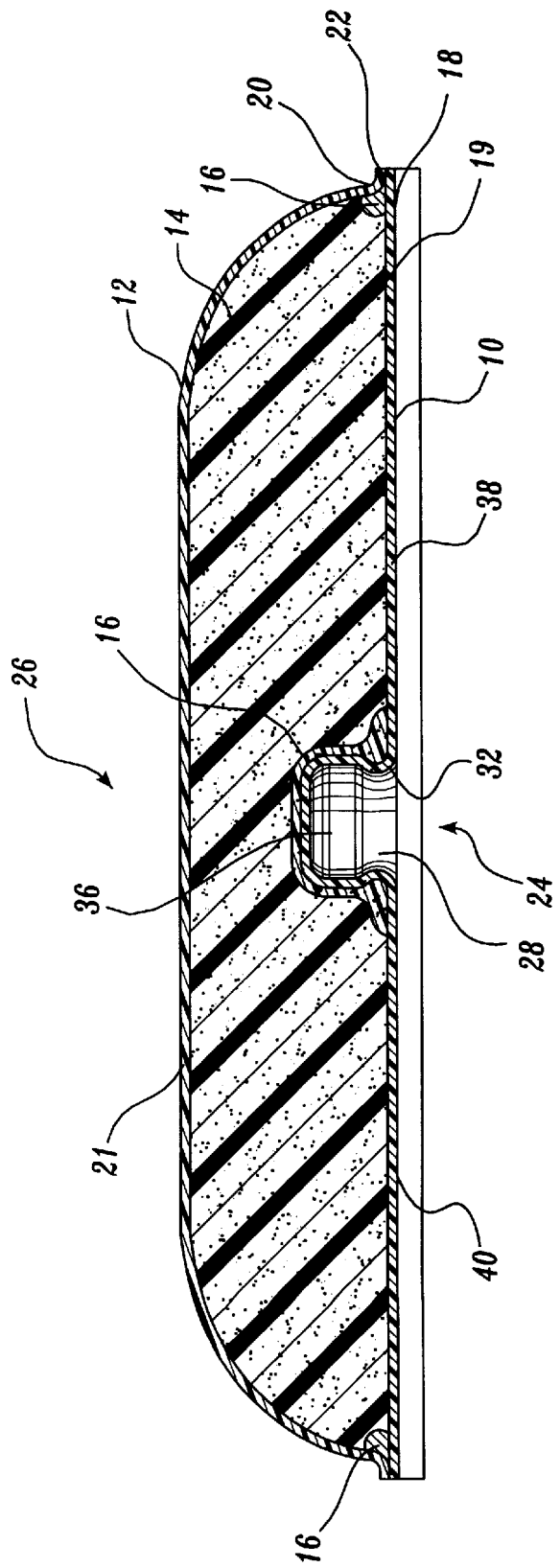
FIG. 2 is a lateral cross-sectional view of a second embodiment of the present invention taken through the center of a mounting indentation, showing the mounting means for mounting a cushion or the like and showing the two part urethane elastomer between two outer elastomeric layers and between one outer elastomeric layer and the indentation in the inner polymeric filling.

Referring now to the drawings in general, and in particular to FIG. 1 of the drawings, there is shown an exploded isometric view of the present invention in a first embodiment as it is used to seal two elastomeric skins together. It can be seen in FIG. 1 that the present elastomeric assembly and attachment bonds together a first premolded elastomeric skin 10 to a second premolded elastomeric skin 12 such that there is a watertight sealed edge between the two skins 10 and 12 so that water or other liquid cannot penetrate the polymeric cushion filling 14 as seen in FIG. 2, inside. A container or dispenser 15 is used to position a two part urethane elastomer 16 at the outside edge 18 of the inner surface 19 of the first elastomeric skin 10, a polymeric filling 14, as seen in FIG. 2, is formed atop the first elastomeric skin 10 and the outside edge 20 of the inner surface 21 of the second elastomeric skin 12 is attached by conventional means to the outside edge 18 of the inner surface 19 of the first elastomeric skin 10. In this way, the two part urethane elastomer 16 forms a sealed edge 22 or seam between the two elastomeric skins 10 and 12.

Figure 4:
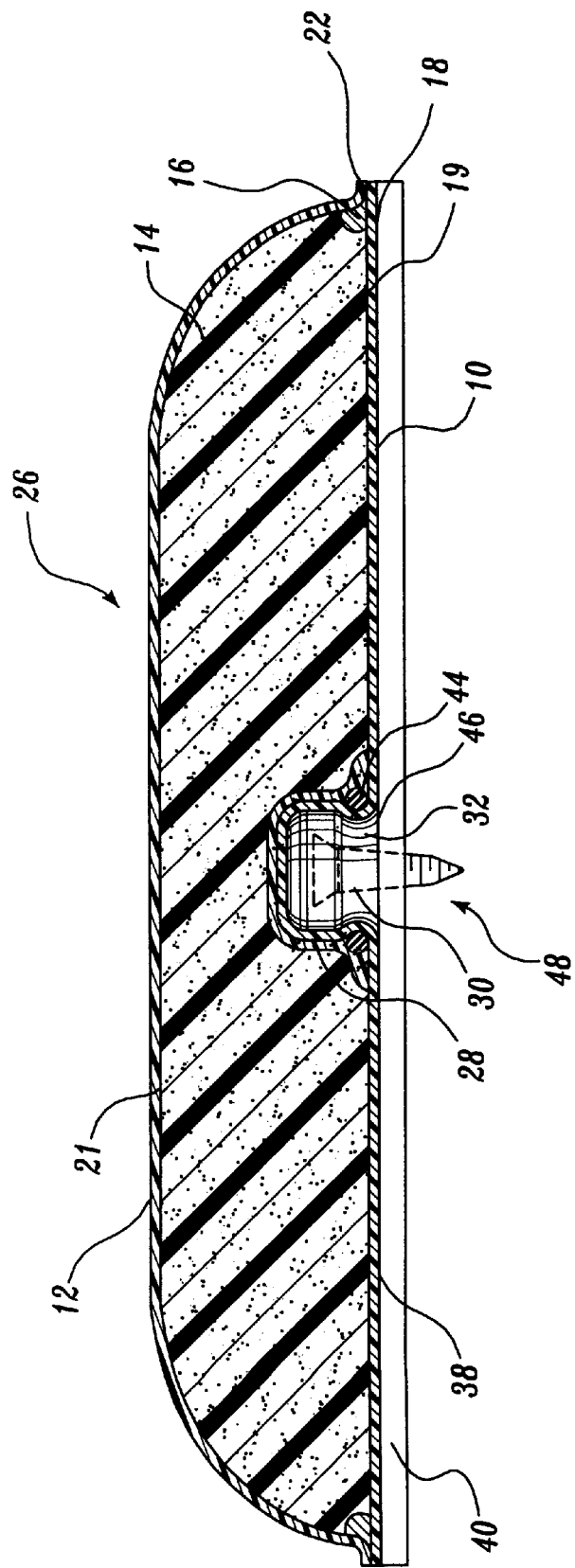
FIG. 4 is a lateral cross-sectional view of a fourth embodiment of the present invention taken through the center of a mounting indentation, showing the mounting means for mounting a cushion or the like using the two part urethane elastomer between an outer elastomeric layer and the indentation in the inner polymeric filling and showing the O-ring positioned around the indentation.
Figure 5:
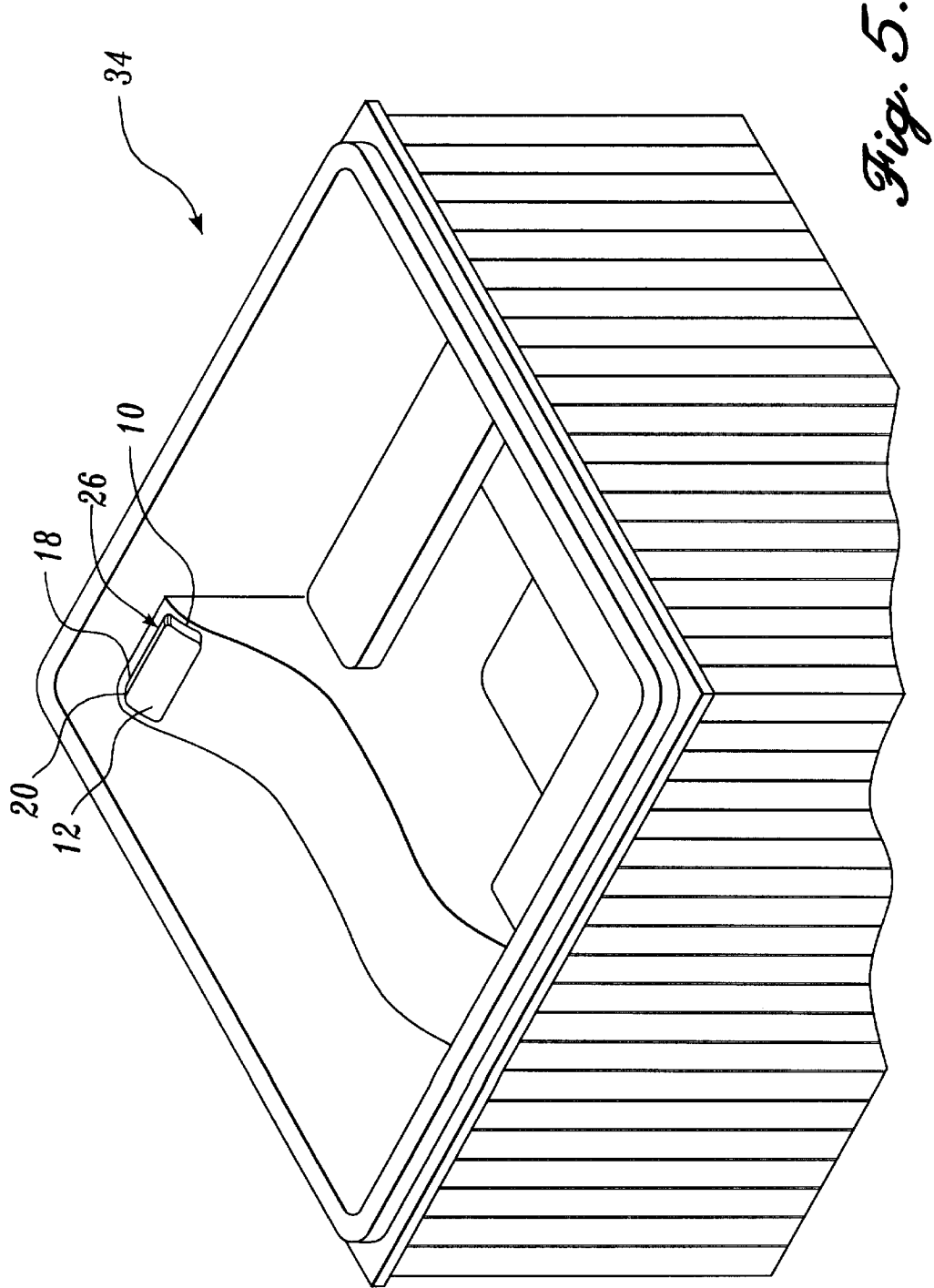
FIG. 5 is an environmental view of the present invention showing a cushion mounted on a hot tub using the assembly and attachment of the mounting means of the present invention.

FIG. 2 is a lateral cross-sectional view of a second embodiment of the present invention taken through the center of the mounting indentation, showing the mounting means 24 for mounting a cushion 26 or the like of the second embodiment and showing the two part urethane elastomer 16 between the two elastomeric layers 10 and 12 and the indentation 28 in the inner polymeric filling 14 of the cushion 26. In conventional hot tub technology, there is often provided an arrangement of button-like protuberances 30 as shown in FIG. 4 situated to receive a receiving indentation or hole 32 on the cushion 26 so that the cushion 26 becomes removably attached to the hot tub 34 as shown also in FIG. 5. It is to be understood that the button like protuberances 30 and the hot tub 34 are used by way of example only and that the receiving indentation 32 could also be used to hold a similarly shaped suction cup, or the receiving indentation 32 could be adapted to hold another kind of attaching arrangement. The hot tub 34 also is used by way of example and the attachment can be to any receiving surface. A problem has arisen in the prior art with many recently attempted receiving arrangements on the cushions, in that an attachment is added to the outer surface of a vinyl covered cushion which reduces the integrity of the water resistance of the vinyl covering. In the present invention, this problem is eliminated in that the mounting means 24 in the form of an indentation 28 is formed without piercing the outer protective elastomeric covering 10 and 12 of the cushion 26. In manufacture of the second embodiment, a first elastomeric layer 10 is positioned over a mating protuberance 36, as seen in FIGS. 1 and 2, to form an indentation 28 in the inner polymeric filling 14 of the cushion 26 and a corresponding receiving indentation 32 on the outer surface 38 of the first elastomeric layer 10. The two part urethane elastomer 16 is applied to the outside edge 18 of the inner surface 19 of the first elastomeric skin 10 and over the protuberance 36, as seen in FIGS. 1 and 2, under the inside surface 19 of the first elastomeric skin 10 that forms the receiving indentation 32 on the outer surface 38 of the first elastomeric skin 10. Polymeric material 14 is then poured onto the inner surface 19 of the first elastomeric skin 10 thereby also forming the indentation 28 in the polymeric filling 14 where the protuberance 36, as seen in FIGS. 1 and 2, is situated. The inner surface 21 of the second elastomeric skin 12 is then placed on top of the inner surface 19 of the first elastomeric skin 10 and the two elastomeric skins 10 and 12 are pressed together for a suitable period of time until the two elastomeric skins 10 and 12 are attached. The finished product then is a polymeric filled elastomeric covered cushion 26 with a sealed edge 22 between the two elastomeric skins 10 and 12. An integral indentation 28, formed in the inner polymeric filling 14 of the cushion 26, that is reinforced and made liquid resistant by the two part urethane elastomer 16, has also been formed in the back 40 of the cushion 26 for mounting the cushion 26 to a hot tub 34, as seen in FIG. 5. Numerous receiving indentations 32 in numerous locations can thus be formed on the back 40 of the cushion 26 to conform to conventional hot tub button protuberance 30 arrangements as seen in FIGS. 4 and 5.

Figure 3:
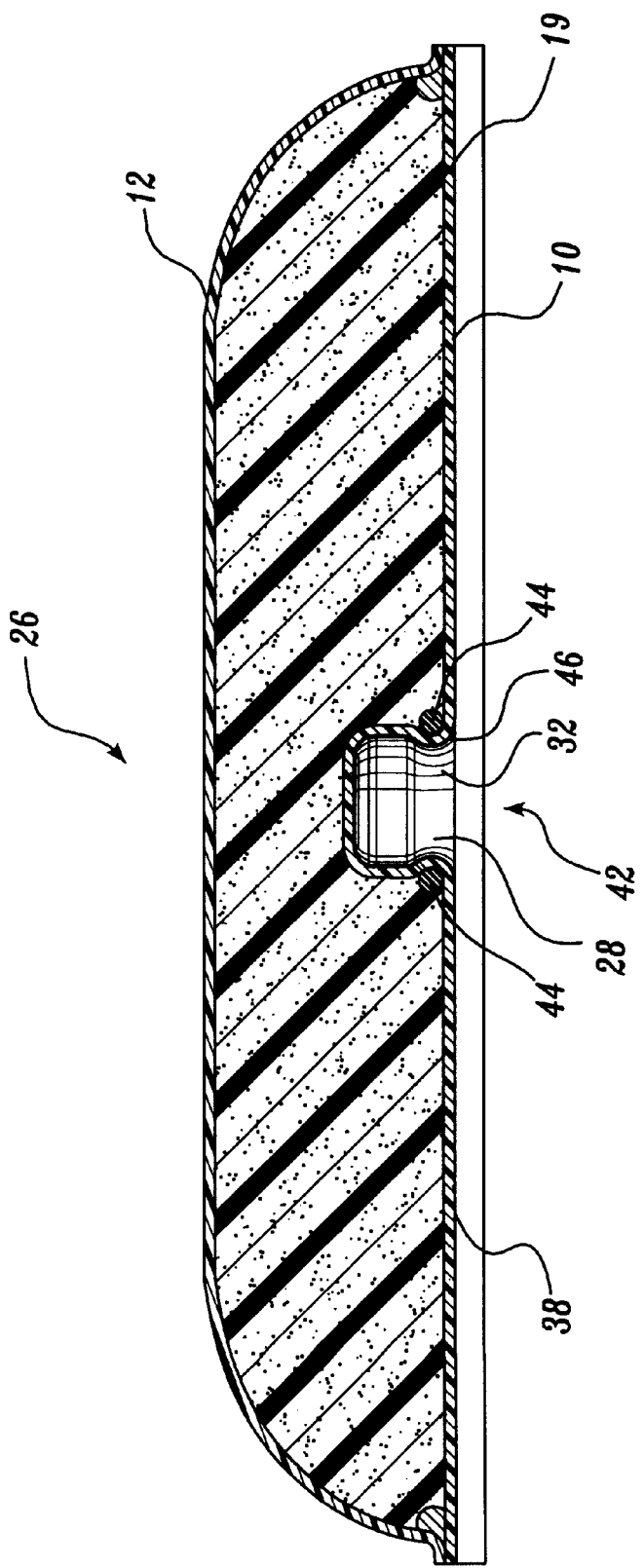
FIG. 3 is a lateral cross-sectional view of a third embodiment of the present invention taken through the center of a mounting indentation, showing the mounting means for mounting a cushion or the like and showing an O-ring positioned around the indentation.

FIG. 3 is a lateral cross-sectional view of a third embodiment of the present invention taken through the center of a mounting indentation, showing the mounting means 42 for mounting a cushion 26 or the like of the third embodiment and showing an O-ring 44 positioned around the indentation 28. In the third embodiment as shown in FIG. 3, the manufacture is similar to that described with reference to the second embodiment of FIG. 2. However, instead of the two part urethane elastomer 16, as seen in FIG. 2, being applied to the protuberance 36, as seen in FIGS. 1 and 2, under the inner surface 19 of the first elastomeric skin 10, an O-ring 44 is placed over the protuberance 36, as seen in FIGS. 1 and 2, such that it falls to the bottom 46 of the protuberance 36 against the inner surface 19 of the first elastomeric skin 10. The O-ring 44 serves to reinforce the receiving indentation 32 in the outer surface 38 of the first elastomeric skin 10 that is formed by the protuberance 36 under the inner surface 19 of the first elastomeric skin 10. The reinforcement provided by the O-ring 44 also serves to provide a semi rigid mounting means 42 in the third embodiment, for more easily mounting the cushion 26 to a hot tub 34, as seen in FIG. 5.

FIG. 4 is a lateral cross-sectional view of a fourth embodiment of the present invention taken through the center of a mounting indentation, showing the mounting means 48 of the fourth embodiment, for mounting a cushion 26 or the like using the two part urethane elastomer 16 between the first elastomeric layer 10 and the indentation 28 in the inner polymeric filling 14 and showing the O-ring 44 positioned around the indentation 28. The fourth embodiment as shown in FIG. 4, represents a combination of the second embodiment as shown in FIG. 2 and the third embodiment as shown in FIG. 3. Therefore, in manufacture, the first elastomeric skin 10 is placed with its outer surface 38 over the protuberance 36, as seen in FIGS. 1 and 2, so that the first elastomeric layer 10 thereby has a receiving indentation 32 placed on the outer surface 38 of the first elastomeric skin 10. Two part urethane elastomer 16 is applied to the outside edge 18 of the inner surface 19 of the first elastomeric skin 10 and over the protuberance 36, as seen in FIGS. 1 and 2, under the inner surface 19 of the first elastomeric skin 10. In the fourth embodiment, therefore, there is provided a watertight seal and reinforcement around the indentation 28 that is formed on the back 40 of the cushion 26 as described with reference to the second embodiment. The O-ring 44 is also placed over the protuberance 36, as seen in FIGS. 1 and 2, under the inner surface 19 of the first elastomeric skin 10. Polymeric material 14 is then poured onto the inner surface 21 of the first elastomeric skin 10; the outside edge 20 of the inner surface 21 of the second elastomeric skin 12 is then placed on top of the outside edge 18 of the inner surface 19 of the first elastomeric skin 10 and the two elastomeric skins 10 and 12 are pressed together to form a watertight sealed edge 22. The fourth embodiment, therefore, also includes the positioning of the O-ring 44 around the bottom 46 of the protuberance 36, as seen in FIGS. 1 and 2, as described with reference to the third embodiment, the O-ring 44 provides further reinforcement and integrity for the receiving indentation 28 so that it does not pull out of the back 40 of the cushion 26 and so that a semi-rigid mounting means 48 is provided to make attachment of the cushion 26 to a corresponding position on a hot tub 34 or spa easy to accomplish as seen in FIG. 5. The fourth embodiment, thereby includes an elastomeric sealed edge 22 between the two elastomeric skins 10 and 12, at least one receiving indentation 32 in the back 40 of the cushion 26 that is sealed and reinforced with two part urethane elastomer 16 and further reinforced with an O-ring 44 to form a semi-rigid mounting means 48.

FIG. 5 is an environmental view of the present invention showing a cushion 26 mounted on a hot tub 34 using the present elastomeric assembly and attachment with two part urethane elastomer serving to seal the edges 18 and 20 of the two elastomeric skins 10 and 12 in a water resistant manner and using the mounting means 24, 42 or 48 as described with reference to any of the second, third or fourth embodiments and shown in FIGS. 2, 3 or 4 respectively. It is to be understood therefore, that any combination as described in the second, third or fourth embodiments will attach the cushion 26 to the hot tub or spa in a manner that will provide a water resistant cover for the cushion 26 and an easy attachment of the cushion 26 to the hot tub or spa 34.

Figure 6:
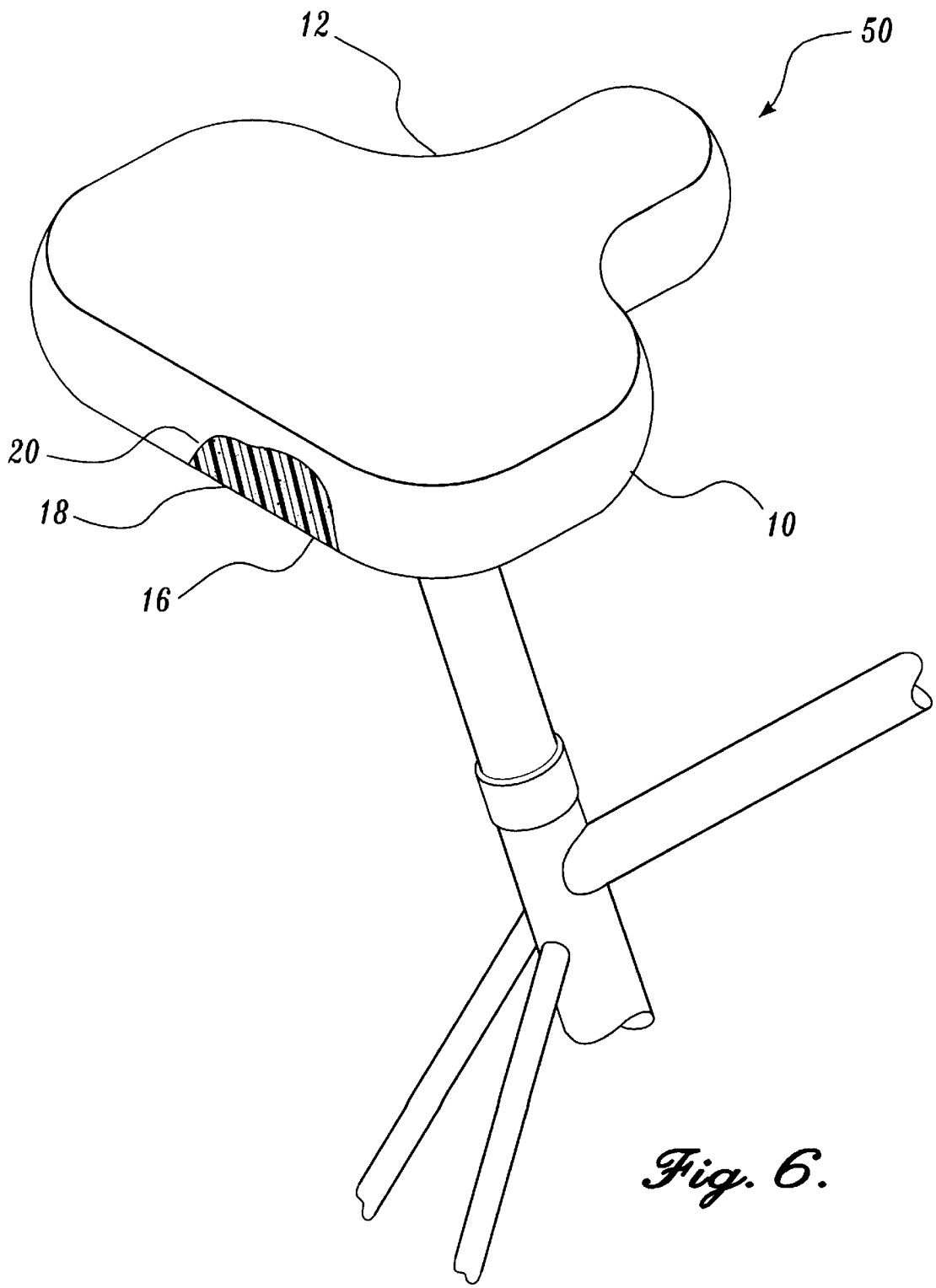
FIG. 6 is an environmental view of the present invention showing the assembly and attachment of a cushion as it is used on a bicycle seat.

FIG. 6 is an environmental view of the present invention showing the present elastomeric assembly and attachment as it is used on a bicycle seat 50. The seat 50 in FIG. 6 has two elastomeric skins 10 and 12 which are attached together as described with reference to FIG. 1 and the first embodiment. In the seat 50 as shown in FIG. 6, with the two part urethane elastomer 16 used at the outside edges 18 and 20 of the two elastomeric skins 10 and 12, as seen in FIGS. 2, 3 and 4, a sturdy and tear resistant seat 50 has been provided by a non-polluting manufacture. FIG. 6 is shown only by way of example, and it is to be understood that the present elastomeric assembly and attachment and the use of the mounting means 24, 42 or 48 of the first, second, or third embodiments is not to be limited by application and is adaptable for use in numerous applications.

A method of providing a water resistant elastomeric assembly and attachment is also disclosed whereby two premolded elastomeric skins are bonded together at the seams with a two part urethane elastomer to form a watertight seal and to provide a cover over a cushion or the like. In addition, portions of the elastomeric skins are reinforced with a two part urethane elastomer and/or an O-ring to form a structural attachment means that does not penetrate the elastomeric skins to cause a loss of integrity.

Referring to the fifth alternate embodiment of FIG. 7, the cushion assembly 100 is configured and constructed as described above, except that the back skin panel 102 includes a flexure assembly 104 molded between the first and second mounting indentations 106 and 108. The flexure assembly 104 is molded in the back skin panel 102 in a manner described above for the formation of the mounting indentations, wherein the back skin panel 102 is placed on a mold having a plurality of vertically aligned ridges projecting upwardly from the mold, longitudinally spaced between first and second protuberances used to form the mounting indentations.

As seen in the preferred embodiment of FIG. 7, the flexure assembly 104 has a plurality of alternating elongate indentations 110 and ridges 112 of equal length. The length of the indentations 110 and ridges 112 are oriented normal to a longitudinal axis extending between the first and second mounting indentations 106 and 108. Although orientating the length of the indentations 110 and ridges 112 normal to the longitudinal axis extending between the first and second mounting indentations 106 and 108 is preferred, other orientations, such as parallel with the longitudinal axis extending between the mounting indentations, is also within the scope of the invention.

As may be seen better in FIG. 8, from a predetermined distance from the first mounting indentation 106, the back skin panel 102 curves inwardly towards the center of the cushion assembly 100 defined midway between the front and back skin panels 101 and 102. The back skin panel 102 continues toward the center of the cushion assembly 100 for a predetermined distance until it curves at a predetermined radius of curvature 180 degrees away from the center of the cushion assembly 100 to define an indentation 110 within the concave portion of the back skin panel 102. Subsequent and similarly shaped indentations are spaced a predetermined distance from the previous indentation, such that a plurality of indentations 110 are formed between the first and second mounting indentations 106 and 108. The plurality of indentations 110 are integrally spaced by a plurality of ridges 112, such that back skin panel 102 in the area of the flexure assembly 104 is corrugated and is defined by the alternating indentations 110 and ridges 112. The upper surface of the ridges 112 are flush with the back skin panel 102, such that the cushion assembly 100 may be flushly mounted against a surface (not shown).

The flexure assembly 104 permits the cushion assembly 100 to flex to a predetermined radius of curvature without causing the elastomeric skin of the cushion assembly 100 to buckle. The corrugated design of the flexure assembly 104 provides the back skin panel 102 with an effective increase in surface area due to the alternating indentations 110 and ridges 112, thereby permitting the cushion assembly 100 to flex about the flexure assembly 104 without applying undue load to the skins and causing the skins to buckle.

In addition to permitting the cushion assembly 100 to flex to a predetermined radius of curvature without causing the skins to buckle, the flexure assembly 104 also saves manufacturing costs. Traditionally, in order to mount a cushion assembly on a curved surface without the skins buckling, the cushion assembly was premolded to the predetermined radius of curvature by using a mold having the desired shape. Because the resulting cushion assembly is curved, the vertical height of the mold is substantially larger than the mold used to form a flat cushion assembly. Therefore, manufacturers of the cushion assembly would have multiple molds for a variety of curved cushion assemblies. The flexure assembly 104 permits manufacturers to use a single, relatively slim mold to form cushion assemblies that may be used for not only flat surfaces, but also curved surfaces, thereby resulting in lower manufacturing costs. The flexure assembly 104 thus provides a universal cushion that may be adapted without modification for installation against mounting surfaces having varying degrees of curvatures, without buckling or undue strain on the cushion.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A cushion assembly comprising:
   (a) first and second premolded skins of elastomeric materials, each of the first and second premolded skins have a perimeter edge;
   (b) an elastic attachment bonding the perimeter edges of the first and second premolded skins together to form a watertight seal therebetween;
   (c) a flexure assembly formed in at least one of the skins to allow the cushion assembly to flex to a predetermined radius of curvature of a surface without buckling the skins; and
   (d) a first mounting indentation formed in at least one of the skins.

2. The cushion assembly of claim 1, further comprising a second mounting indentation longitudinally spaced from the first mounting indentation formed in the same skin as the first mounting indentation.

3. The cushion assembly of claim 2, further comprising a reinforcement positioned around the mounting indentation to reinforce the mounting indentation.

4. The cushion assembly of claim 3, wherein the mounting indentation further comprises an O-ring positioned around the indentations.

5. The cushion assembly of claim 4, further comprising a layer of elastomer positioned on the mounting indentations to reinforce the mounting indentations.

6. The cushion assembly of claim 1, further comprising an O-ring positioned around the first and second mounting indentations to reinforce the mounting indentations.

7. The cushion assembly of claim 6, wherein the flexure assembly further comprises a plurality of alternating indentations and ridges.

8. The cushion assembly of claim 7, wherein the indentations and ridges are elongate in shape, the indentations and ridges are oriented on the second skin normal to a longitudinal axis extending between the first and second mounting indentations.

9. A cushion assembly having an attachment bond for bonding together premolded first and second skins of elastomeric materials and first and second ends longitudinally spaced by top and bottom edge surface, the cushion assembly and attachment bond further comprising:
   (a) an elastic attachment bonding the first and second skins together to form a watertight seal therebetween;
   (b) first and second mounting indentations formed in the second skin, the first mounting indentation formed a predetermined distance from the first end of the cushion assembly, the second mounting indentation formed a predetermined distance from the second end of the cushion assembly; and
   (c) a flexure assembly formed in the second skin between the first and second mounting indentations to allow the cushion assembly to flex to a predetermined radius of curvature without buckling the first and second skins.

* * * * *

UNITED STATES PATENT AND TRADEMARK OFFICE
CERTIFICATE OF CORRECTION

PATENT NO.    : 6,124,009
DATED         : September 26, 2000
INVENTOR(S)   : L.D. Havens Page 1 of 1

It is certified that error appears in the above-identified patent and that said Letters Patent is hereby corrected as shown below:

<u>Title page,</u>
Item [56] References Cited, U.S. PATENT DOCUMENTS, insert in appropriate numerical order the following reference: -- 3,016,317   1/1962   Brunner --

Signed and Sealed this

Twenty-ninth Day of January, 2002

Attest:

Attesting Officer

JAMES E. ROGAN
*Director of the United States Patent and Trademark Office*